United States Patent
Aoki et al.

(10) Patent No.: US 10,263,714 B2
(45) Date of Patent: Apr. 16, 2019

(54) MOBILE TERMINAL TESTING DEVICE AND TRANSMITTING ANTENNA TESTING METHOD

(71) Applicants: Kazunori Aoki, Atsugi (JP); Takayuki Awano, Atsugi (JP); Yuki Higuchi, Atsugi (JP)

(72) Inventors: Kazunori Aoki, Atsugi (JP); Takayuki Awano, Atsugi (JP); Yuki Higuchi, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 15/623,973

(22) Filed: Jun. 15, 2017

(65) Prior Publication Data

US 2017/0366282 A1 Dec. 21, 2017

(30) Foreign Application Priority Data

Jun. 17, 2016 (JP) .................................. 2016-120573

(51) Int. Cl.
| | |
|---|---|
| *H04W 24/06* | (2009.01) |
| *H04B 17/15* | (2015.01) |
| *H04W 76/25* | (2018.01) |
| *H04B 17/10* | (2015.01) |

(52) U.S. Cl.
CPC ........... *H04B 17/15* (2015.01); *H04B 17/102* (2015.01); *H04W 76/25* (2018.02)

(58) Field of Classification Search
CPC .............................. H04B 17/15; H04W 76/045
See application file for complete search history.

(56) References Cited

U.S. PATENT DOCUMENTS

| | | | | |
|---|---|---|---|---|
| 7,366,508 | B2 * | 4/2008 | Hasegawa ............. | H04W 24/00 455/115.1 |
| 9,490,918 | B2 * | 11/2016 | Negus ................... | H04W 24/02 |
| 2013/0128826 | A1 * | 5/2013 | Lin ....................... | H04L 1/1861 370/329 |

FOREIGN PATENT DOCUMENTS

JP 2011-082791 4/2011

* cited by examiner

*Primary Examiner* — Tuan H Nguyen
(74) *Attorney, Agent, or Firm* — Greer Burns & Crain Ltd.

(57) ABSTRACT

According to one embodiment, a mobile terminal testing device which tests a mobile terminal including a plurality of transmitting antennas by transmitting/receiving radio signals between the mobile terminal testing device and the mobile terminal, includes a radio signal processing module configured to transmit and receive radio signals to and from the mobile terminal and a controller configured to cause the mobile terminal to switch one from another among the plurality of transmitting antennas by a predetermined radio signal transmitted to the mobile terminal via the radio signal processing module.

8 Claims, 2 Drawing Sheets

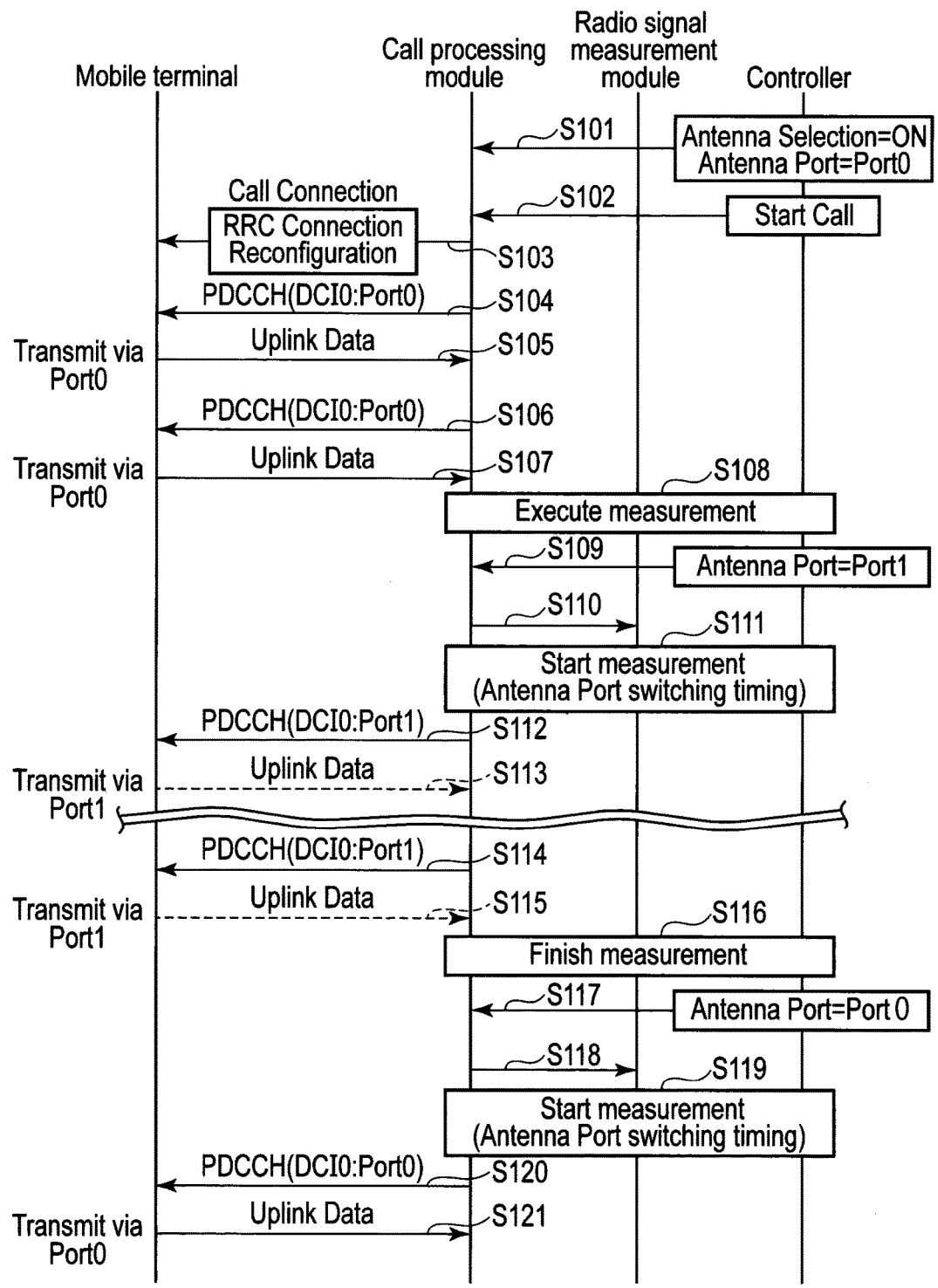
F I G. 2

MOBILE TERMINAL TESTING DEVICE AND TRANSMITTING ANTENNA TESTING METHOD

CROSS-REFERENCE TO RELATED APPLICATIONS

This application is based upon and claims the benefit of priority from prior Japanese Patent Application No. 2016-120573 filed Jun. 17, 2016, the entire contents of which are incorporated herein by reference.

BACKGROUND OF THE INVENTION

1. Field of the Invention

Embodiments described herein relate generally to a mobile terminal testing device for testing mobile communication terminals and also a transmitting antenna testing method.

2. Description of the Related Art

When a mobile communication terminal such as a mobile phone or a data communication terminal is developed, it is necessary to test whether the developed mobile communication terminal can communicate normally. Here, the mobile communication terminal to be tested is connected to a testing device which operates as a pseudo base station simulating the function of an actual base station in order to try communication between the testing device and the mobile communication terminal, and thus the test is carried out to check the contents of the communication.

The mobile communication terminals conforming to the standards of Long Term Evolution-Advanced (LTE-A) are permitted to include a plurality of transmitting antennas. But mobile communication terminal with a plurality of transmitting antennas need to be subjected to a transmission test for each antenna, a test for antenna switching and the like, and thus the transmitting antennas used of a mobile communication terminal to be tested must be switched for each of these tests. However, in the usual status, the user cannot designate a transmitting antenna to be used by the mobile communication terminal.

As a technique to avoid such a drawback, the following is known. That is, an external control device is connected to a mobile terminal device, and the testing function of the mobile terminal device is controlled by the external control device to carry out the tests (JP No. 2011-82791 A).

However, for testing a mobile communication terminal by connecting the external control device to a mobile communication terminal, the external control device need to conform to the model of the terminal to be tested, which takes some time and effort to construct the test atmosphere. Therefore, when various kinds of models of mobile communication terminals are to be tested, the test atmosphere needs to be changed according to the model, taking great time and effort.

Note that in the following description, the above-used mobile communication terminal will be referred to as mobile terminal for simplification.

BRIEF SUMMARY OF THE INVENTION

According to the first aspect of the invention, there is provided a mobile terminal testing device (1) which tests a mobile terminal (2) including a plurality of transmitting antennas by transmitting/receiving radio signals between the mobile terminal testing device (1) and the mobile terminal (2), the mobile terminal testing device (1) comprising: a radio signal processing module (10) configured to transmit and receive radio signals to and from the mobile terminal (2); and a controller (15) configured to cause the mobile terminal (2) to switch one from another among the plurality of transmitting antennas by a predetermined radio signal transmitted to the mobile terminal (2) via the radio signal processing module (10).

With this structure, the transmitting antennas of the mobile terminal are switched therebetween by radio signals transmitted/received between the mobile terminal testing device and the mobile terminal. Therefore, the transmitting antennas can be tested without connecting the mobile terminal to an external control device by switching the transmitting antennas therebetween.

According to the second aspect of the invention, there is provided a mobile terminal testing device (1) according to the first aspect, wherein the controller (15) sends an RRC message to the mobile terminal (2) to select a transmitting antenna according to an instruction from the testing device (1), and causes the mobile terminal (2) to switch to a transmitting antenna designated by PDCCH.

With this structure, the transmitting antennas of the mobile terminal are switched therebetween by RRC message and PDCCH conforming to the LTE-A standards. Therefore, the transmitting antennas can be tested without incorporating a special function to the mobile terminal.

According to the third aspect of the invention, there is provided a mobile terminal testing device (1) according to the second aspect, wherein the controller (15) measures a signal received from the mobile terminal (2) in coincidence with a timing of causing the mobile terminal (2) to switch to the transmitting antenna by the PDCCH.

With this structure, the received signal is measured at the timing of switching to another antenna. Therefore, the measuring of a signal while switching one antenna to another can be easily carried out.

According to the fourth aspect of the invention, there is provided a mobile terminal testing device (1) according to the first aspect, further comprising: a call processing module (12), wherein the controller (15) outputs to the call processing module (12), a first signal which enables the mobile terminal testing device (1) to designate selection of a transmitting antenna, and a second signal which designates the transmitting antenna, and the call processing module (12) transmits a predetermined RRC message to the mobile terminal (2) based on the first signal and thereafter transmits a predetermined PDCCH to the mobile terminal (2) based on the second signal.

According to the fifth aspect of the invention, there is provided a mobile terminal testing device (1) according to the fourth aspect, further comprising: a user interface (14) configured to set a parameter and a scenario for operating the mobile terminal testing device (1), wherein the controller (15) controls operation of the mobile terminal testing device (1) based on the parameter and the scenario thus set.

According to the sixth aspect of the invention, there is provided a mobile terminal testing device (1) according to the fifth aspect, wherein the controller (15) notifies the set parameter to the call processing module (12) and establishes a communication conforming to the set parameter.

According to the seventh aspect of the invention, there is provided a mobile terminal testing device (1) according to the fifth aspect, wherein the controller (15) transmits the set scenario to the call processing module to carry out an operation according to the set scenario.

According to the eighth aspect of the invention, there is provided a mobile terminal testing device (1) according to the fourth aspect, further comprising: a radio signal measurement module (13) configured to measure the signal received from the mobile terminal (2), wherein the controller (15) transmits an instruction signal which sets a timing of switching one from another among the transmitting antennas to the radio signal measurement module (13) via the call processing module (12), and the radio signal measurement module (13) starts measurement of the received signal at the timing.

According to the ninth aspect of the invention, there is provided a mobile terminal testing device (1) according to the fourth aspect, wherein the predetermined RRC message includes a field for designating the selection of a transmitting antenna of the mobile terminal (2) by the mobile terminal testing device (1), and the predetermined PDCCH includes control information which designates the transmitting antenna of the mobile terminal (2).

According to the tenth aspect of the invention, there is provided a mobile terminal testing device (1) according to the ninth aspect, wherein the predetermined RRC message is "RRC Connection Reconfiguration" including a field "ue-TransmitAntennaSelection", and the control information of the predetermined PDCCH is a DCI format 0 including a field "Antenna Selection mask".

According to the eleventh aspect of the invention, there is provided a transmitting antenna testing method for a mobile terminal testing device (1) which tests a mobile terminal (2) including a plurality of transmitting antennas by transmitting/receiving radio signals between the mobile terminal testing device (1) and the mobile terminal (2), the method comprising: a step of enabling by an RRC message the mobile terminal testing device (1) to designate selection of the plurality of transmitting antennas of the mobile terminal (2); and a step of designating a transmitting antenna of the mobile terminal (2) by PDCCH.

With this structure, the transmitting antennas of the mobile terminal are switched therebetween by radio signals transmitted/received between the mobile terminal testing device and the mobile terminal. Therefore, the transmitting antennas can be tested without connecting the mobile terminal to an external control device by switching the transmitting antennas therebetween.

According to the twelfth aspect of the invention, there is provided a transmitting antenna testing method according to the eleventh aspect, further comprising: a step of measuring a signal received from the mobile terminal (2) in coincidence with a timing of causing the mobile terminal (2) to switch from an transmitting antenna to another by the PDCCH.

According to the thirteenth aspect of the invention, there is provided a transmitting antenna testing method according to the eleventh aspect, wherein the predetermined RRC message includes a field for designating the selection of a transmitting antenna of the mobile terminal (2) by the mobile terminal testing device (1), and the predetermined PDCCH includes control information which designates the transmitting antenna of the mobile terminal (2).

According to the fourteenth aspect of the invention, there is provided a transmitting antenna testing method according to the thirteenth aspect, wherein the predetermined RRC message is "RRC Connection Reconfiguration" including a field "ue-TransmitAntennaSelection", and control information of the predetermined PDCCH is a DCI format 0 including a field "Antenna Selection mask".

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary sequence diagram illustrating a procedure of a transmitting antenna testing method for the mobile terminal testing device according to an embodiment of the present invention.

DETAILED DESCRIPTION OF THE INVENTION

Figure 1:
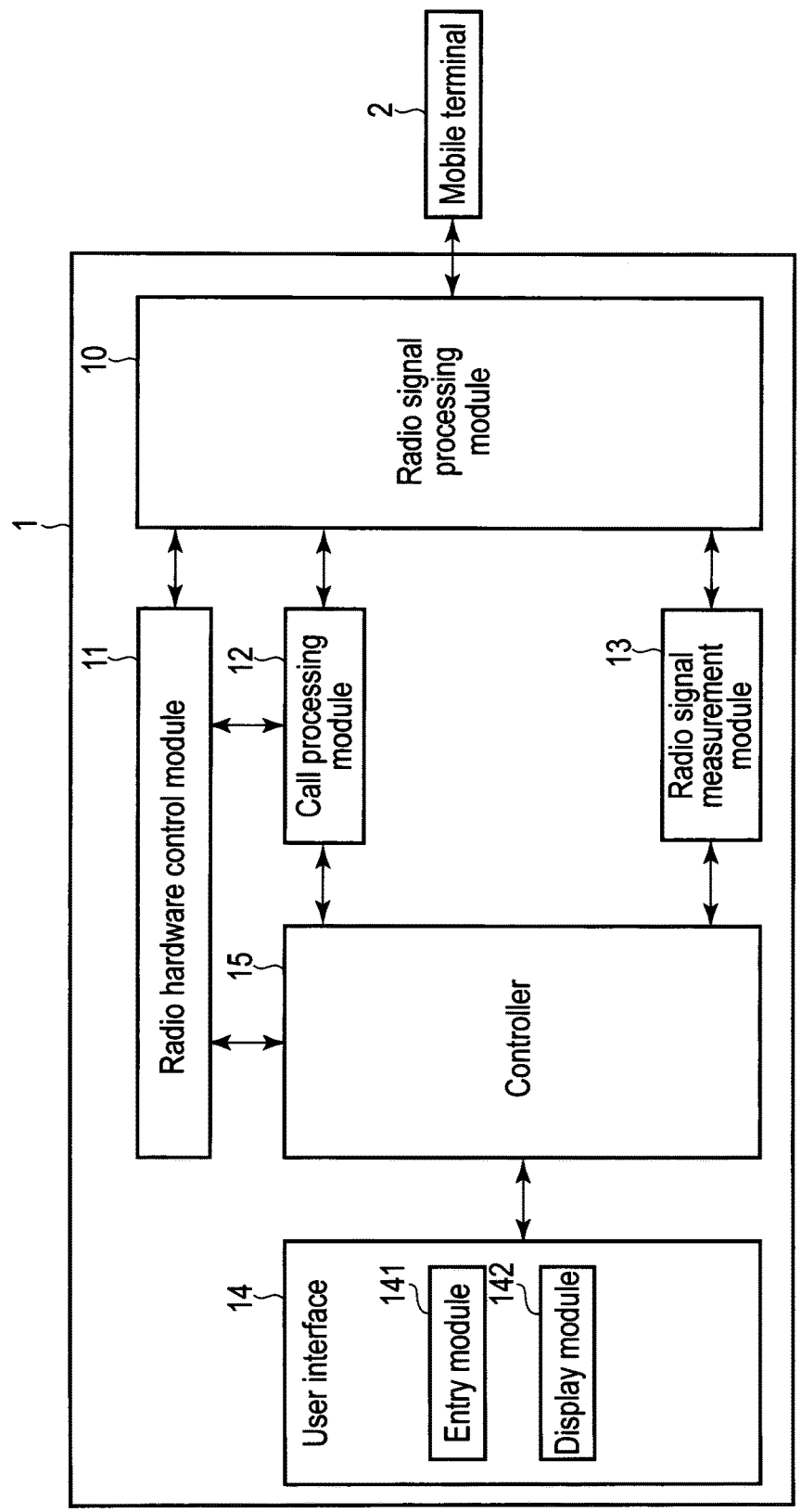
FIG. 1 is an exemplary block diagram of a mobile terminal testing device according to an embodiment of the present invention.

A mobile terminal testing device according to an embodiment of the present invention will be described in detail with reference to accompanying drawings.

FIG. 1 shows a mobile terminal testing device 1 according to the embodiment. The mobile terminal testing device 1, as a pseudo base station, transmits and receives radio signals between itself and a mobile terminal 2 by a wire via a coaxial cable or the like. Note that the mobile terminal testing device 1 may transmit and receive signals between itself and the mobile terminal 2 by radio through an antenna. The mobile terminal testing device 1 is configured to confirm to the LTE-A standards and communicates with the mobile terminal 2 based on the LTE-A standards.

The mobile terminal testing device 1 comprises a radio signal processing module 10, a radio hardware control module 11, a call processing module 12, a radio signal measurement module 13, a user interface 14 and a controller 15.

The radio signal processing module 10 transmits and receives radio signals between itself and the mobile terminal 2. The radio signal processing module 10 carries out processes such as coding, modulation and frequency conversion onto transmission data entering from the call processing module 12 and the radio signal measurement module 13, to produce radio signals, and transmits them to the mobile terminal 2. Further, the radio signal processing module 10 carries out processes such as frequency conversion, demodulation and decoding onto radio signals received from the mobile terminal 2, and outputs them to the call processing module 12 and the radio signal measurement module 13.

The radio hardware control module 11 controls the radio signal processing module 10 to controls the transmission/reception level, frequency, etc. of the radio signals.

The call processing module 12 is connected to the radio signal processing module 10 and the radio hardware control module 11. The call processing module 12 transmits a setting signal to the radio hardware control module 11 according to a scenario or the like set according to the test conditions, and instructs the radio signal processing module 10 to transmit a radio signal conforming to the scenario or the like. Meanwhile, the call processing module 12 transmits and receives radio signals between itself and the mobile terminal 2 through the radio signal processing module 10, and establish a call connection conforming to the test condition between itself and the mobile terminal 2 to carry out a call control corresponding to the scenario.

The radio signal measurement module 13 is connected to the radio signal processing module 10. The radio signal measurement module 13 measures the transmission/reception level, throughput, etc. of the radio signal transmitted/received by the radio signal processing module 10, and outputs the measurement result to the controller 15. The controller 15 associates the measurement result transmitted from the radio signal measurement module 13 with time data and the like and stores it to a hard disk or the like. The controller 15 outputs the measurement result and the like to display on the user interface 14 at a user's request, and outputs them to a file as a log.

The user interface 14 comprises an entry unit 141 and a display module 142. The entry unit 141 receives an operational entry from the user. The display module 142 displays a screen for setting parameters, a measurement result of the radio signal measurement module 13, etc., mentioned above. The entry unit 141 comprises a touchpad, a keyboard, a push button, or the like. The display module 142 comprises a liquid crystal display or the like.

The controller 15 comprises a computer unit comprising a central processing unit (CPU), a random access memory (RAM), a read-only memory (ROM), a hard disk drive, and an input/output port (not shown). On the ROM and the hard disk drive, a program which causes the computer to function as the controller 15 is stored together with various control constants, various maps, etc. That is, with the CPU executing the program stored on the ROM and the hard disk drive, the computer unit functions as the controller 15.

To the input/output port of the controller 15, the radio hardware control module 11, the call processing module 12, the radio signal measurement module 13 and the user interface 14 are connected.

Note that in this embodiment, the radio hardware control module 11, the call processing module 12, and the radio signal measurement module 13 each comprises a processor such as a digital signal processor (DSP) programmed to execute the respective processing. Further, the radio signal processing module 10 comprises a communication module.

The controller 15 displays the setting screen on the display module 142 for the user to carry out entries from the entry unit 141 as instructed on the setting screen, and thus the parameter which causes the test device to operate as a pseudo base station conforming to the test condition, and the scenario which defines the call control procedure corresponding to the test condition are set. The controller 15 transmits the setting signal to the radio hardware control module 11 based on the parameter thus set. The controller 15 controls the frequencies and multiplexing systems of radio signals transmitted/received by the radio signal processing module 10 via the radio hardware control module 11, and causes the radio signal measurement module 13 to measure. Further, the controller 15 notifies the set parameter to the call processing module 12 and establishes a communication conforming to the set parameter.

Further, the controller 15 transmits the scenario specified by the entry unit 141 to the call processing module 12, and causes the call processing module 12 to operate a call control and the like according to the designated scenario.

Furthermore, according to the instruction input to the entry unit 141, the controller 15 transmits the signals to the radio hardware control module 11 and the call processing module 12 and causes these modules 11 and 12 to operate the call control and the like according to the instruction entered.

The mobile terminal testing device 1 of this embodiment can carry out the transmission test by itself on each of a plurality of transmitting antennas of the mobile terminal 2.

The controller 15 causes the mobile terminal 2 to switch among the transmitting antennas by a radio signal transmitted to the mobile terminal 2. More specifically, the controller 15 uses a radio resource control (RRC) message and downlink control information (DCI) format 0 of physicaldownlink control channel (PDCCH) to cause the mobile terminal 2 switch one from another among these transmitting antennas.

According to the LTE-A standards, it is possible to set in the field "ue-TransmitAntennaSelection" of "RRC Connection Reconfiguration", which is an RRC message, to enable the base station side to designate the selection of a transmitting antenna of the mobile terminal 2. Further, according to the LTE-A standards, after setting by the "RRC Connection Reconfiguration" message to enable the base station side to designate the selection of a transmitting antenna of the mobile terminal 2, a transmitting antenna of the mobile terminal 2 is designated in the field "Antenna selection mask" of the DCI format 0 which is control information. Thus, the antenna of the mobile terminal 2 can be selected.

When, for example, the test of the transmitting antennas of the mobile terminal 2 is selected, the controller 15 causes the call processing module 12 to transmit the "RRC Connection Reconfiguration" message to enable the base station side to designate the selection of a transmitting antenna of the mobile terminal 2.

Then, the controller 15 notifies the antenna to select to the call processing module 12 and designates the antenna to select by the control information DCI format 0 of PDCCH, thereby causing the base station to select a transmitting antenna.

Moreover, the controller 15 notifies by transmission the antenna to select and the timing for starting measurement, which is the timing for switching an antenna to another to the call processing module 12, thus causing the mobile terminal 2 to switch the antenna changed at the measurement start timing, and the radio signal measurement module 13 to carry out the measurement at the measurement start timing.

Upon receiving the measurement start timing signal, the call processing module 12 transmits the measurement start timing signal to the radio signal measurement module 13 via the controller 15, and causing the radio signal measurement module 13 to start the measurement at the measurement start timing.

Upon receiving the measurement start timing signal, the radio signal measurement module 13 starts the measurement at the measurement start timing.

The procedure of the transmitting antenna test of the mobile terminal 2 by the mobile terminal testing device 1 will be described.

When the function of parameter setup is selected by operation on the entry unit 141, the controller 15 displays a parameter setting screen on the display module 142, for example, to set the band, duplex mode, channel bandwidth and the like as parameters of the pseudo base station.

The controller 15 stores the set parameters to the hard disk drive and notifies the parameters to the call processing module 12 to be able to control radio signals according to the set parameters.

After setting the parameters, the mobile terminal testing device 1 and the mobile terminal 2 are connected with a cable. For example, when the power of the mobile terminal 2 is turned on, location registration is carried out. Here, it is checked whether the location registration has been normally carried out on the mobile terminal testing device 1 side. Note that when the mobile terminal 2 comprises a plurality of transmitting antennas, a coupler which couples the outputs of a plurality of antenna ports should be used to input the outputs of the antenna ports altogether to the antenna ports of the mobile terminal testing device 1.

When a call connection is carried out by operation of the entry unit 141 while the location registration is valid, the controller 15 instructs the call processing module 12 to carry out call connection, thus connecting the call to the mobile terminal 2.

When the instruction to start the measurement of the transmitting antenna test of the mobile terminal 2 is operated via the entry unit 141 while the call connection is on, the processes shown in the sequence diagram of FIG. 2 are carried out.

In Step S101, the controller 15 transmits to the call processing module 12, a signal (first signal) in which a parameter "Antenna Selection" enabling the selection of the antennas of the mobile terminal 2 is on, and another signal (second signal) in which a parameter "Antenna Port" indicating an antenna port to select is set to Port0.

In Step S102, the controller 15 transmits to the call processing module 12, an instruction signal in which an order "Start Call" indicating the start of the test is set.

When receiving the instruction signal in which the order "Start Call" is set, the call processing module 12 transmits to the mobile terminal 2, the "RRC Connection Reconfiguration" message in which "setup/closedLoop" is set to the field "ue-TransmitAntennaSelection" of "RRC Connection Reconfiguration" in Step S103.

In Step S104, the call processing module 12 sets to the control information DCI format 0 of PDCCH to transmit Uplink Data via Port0 of the antenna and reports to the mobile terminal 2.

In response to this, the mobile terminal 2 transmits Uplink Data via Port0 in Step S105.

Then, in Step S106, a notification is made to transmit Uplink Data via Port0 of the antenna using control information DCI format 0 of PDCCH, and in Step S107, the mobile terminal 2 transmits Uplink Data via Port0.

In this state, in Step S108, the radio signal measurement module 13 measures the received signal.

Next, in order to measure the received signal while switching a transmitting antenna to another, in Step S109, the controller 15 transmits to the call processing module 12 a signal (third signal) in which the parameter "Antenna Port" is set to Port1, and an instruction signal setting the measurement start timing, which is the timing for switching the antenna port.

When the signal (third signal) in which the parameter "Antenna Port" is set to Port1, and the instruction signal in which the measurement start timing is set are received, in Step S110, the call processing module 12 transmits the instruction signal which sets the measurement start timing to the radio signal measurement module 13 via the controller 15. Note that in FIG. 2, in Step S110 and Step S118, which will be described later, the illustration is omitted but the call processing module 12 is connected to the radio signal measurement module 13 indirectly via the controller 15.

When receiving the instruction signal in which the measurement start timing is set, in Step S111, the radio signal measurement module 13 starts the measurement at the measurement start timing.

Similarly, in Step S112, at the measurement start timing, the call processing module 12 sets to the control information DCI format 0 of PDCCH to transmit Uplink Data via the Port1 of the antenna and notifies to the mobile terminal 2.

In response to this, in Step S113, the mobile terminal 2 switches to Port1 from Port0 and transmits Uplink Data therethrough.

After that, in Step S114, it is notified to transmit Uplink Data via Port1 of the antenna in the control information DCI format 0 of PDCCH, and thus in Step S115, the mobile terminal 2 transmits Uplink Data via Port1.

In the meantime, the signal received via Port1 of the antenna of the mobile terminal 2 is measured, and in Step S116, the measurement is finished.

Subsequently, in order to measure the received signal while switching the transmitting antenna from Port1 to Port0, in Step S117, the controller 15 transmits to the call processing module 12 the signal (second signal) in which the parameter "Antenna Port" is set to Port0, and an instruction signal setting the measurement start timing, which is the timing for switching the antenna port.

When receiving the signal in which the parameter "Antenna Port" is set to Port0 and the measurement start timing is set, in Step S118, the call processing module 12 transmits the instruction signal sets the measurement start timing to the radio signal measurement module 13 via the controller 15.

Upon receiving the instruction signal setting the measurement start timing, in Step S119, the radio signal measurement module 13 starts the measurement at the measurement start timing.

Similarly, in Step S120, the call processing module 12 sets at the measurement start timing the control information DCI format 0 of PDCCH to transmit Uplink Data via Port0 of the antenna and notifies to the mobile terminal 2.

In response to this, in Step S121, the mobile terminal 2 switches to Port0 from Port1 and transmits Uplink Data therethrough.

As described above, the transmitting antennas are tested while switching one transmitting antenna to another in the mobile terminal 2 by the radio signal transmitted to the mobile terminal 2. Therefore, the transmitting antennas can be tested by switching one to another without connecting an external control device or the like to the mobile terminal 2.

Moreover, the transmitting antennas are switched from one to another by the mobile terminal 2 using an RRC message and the control information DCI format 0 of PDCCH, the transmitting antennas can be tested by switching one to another without incorporating a special function to the mobile terminal 2.

Furthermore, the measurement is carried out according to the timing of switching the transmitting antennas from one to another using the control information DCI format 0 of PDCCH, the signal reception while switching one transmitting antenna to another can be easily measured as well.

Embodiments of the present invention are as disclosed above, but naturally, they may be modified by a person having ordinary skill in the art as long as they fall within the scope and spirit of the present invention. The accompanying claims and their equivalents are intended to cover such forms or modifications as would fall within the scope and spirit of the inventions.

The various modules of the systems described herein can be implemented as software applications, hardware and/or software modules, or components on one or more computers, such as servers. While the various modules are illustrated separately, they may share some or all of the same underlying logic or code.

Various inventions can be achieved by any suitable combination of a plurality of structural elements disclosed in the embodiments. For example, some structural elements may be deleted from the whole structural elements indicated in the above-described embodiment. Furthermore, some structural elements of one embodiment may be combined with other structural elements of another embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal testing device which tests a mobile terminal including a plurality of transmitting antennas by transmitting/receiving radio signals between the mobile terminal testing device and the mobile terminal, the mobile terminal testing device comprising:
    a radio signal processing module configured to transmit and receive radio signals to and from the mobile terminal;
    a controller configured to cause the mobile terminal to switch one from another among the plurality of transmitting antennas by a predetermined radio signal transmitted to the mobile terminal via the radio signal processing module; and
    a call processing module,
    wherein
    the controller outputs to the call processing module, a first signal which enables the mobile terminal testing device to designate selection of a transmitting antenna, and a second signal which designates the transmitting antenna, and
    the call processing module transmits a predetermined RRC message to the mobile terminal based on the first signal and thereafter transmits a predetermined PDCCH to the mobile terminal based on the second signal.

2. The testing device according to claim 1, further comprising:
    a user interface configured to set a parameter and a scenario for operating the mobile terminal testing device,
    wherein
    the controller controls operation of the mobile terminal testing device based on the parameter and the scenario thus set.

3. The testing device according to claim 2, wherein
    the controller notifies the set parameter to the call processing module and establishes a communication conforming to the set parameter.

4. The testing device according to claim 2, wherein
    the controller transmits the set scenario to the call processing module to carry out an operation according to the set scenario.

5. The testing device according to claim 1, further comprising:
    a radio signal measurement module configured to measure the signal received from the mobile terminal,
    wherein
    the controller transmits an instruction signal which sets a timing of switching one from another among the transmitting antennas to the radio signal measurement module via the call processing module, and
    the radio signal measurement module starts measurement of the received signal at the timing.

6. The testing device according to claim 1, wherein
    the predetermined RRC message includes a field for designating the selection of a transmitting antenna of the mobile terminal by the mobile terminal testing device, and
    the predetermined PDCCH includes control information which designates the transmitting antenna of the mobile terminal.

7. The testing device according to claim 6, wherein
    the predetermined RRC message is "RRC Connection Reconfiguration" including a field "ue-TransmitAntennaSelection", and
    the control information of the predetermined PDCCH is a DCI format 0 including a field "Antenna Selection mask".

8. A transmitting antenna testing method for a mobile terminal testing device which tests a mobile terminal including a plurally of transmitting antennas by transmitting/receiving radio signals between the mobile terminal testing device and the mobile terminal, the method comprising:
    a step of enabling by an RRC message the mobile terminal testing device to designate selection of the plurality of transmitting antennas of the mobile terminal; and
    a step of designating a transmitting antenna of the mobile terminal by PDCCH,
    wherein
    the predetermined RRC message includes a field for designating the selection of the transmitting antenna of the mobile terminal by the mobile terminal testing device,
    the predetermined PDCCH includes control information which designates the transmitting antenna of the mobile terminal,
    the predetermined RRC message is "RRC Connection Reconfiguration" including a field "ue-TransmitAntennaSelection", and
    control information of the predetermined PDCCH is a DCI format 0 including a field "Antenna Selection mask".

* * * * *